United States Patent [19]

Komoto

[11] 4,284,330
[45] Aug. 18, 1981

[54] ADVANCE MECHANISM FOR CLOSE-UP LENS

[75] Inventor: Shinsuke Komoto, Tokyo, Japan

[73] Assignee: Asahi Kogaku Kogyo Kabushiki Kaisha, Tokyo, Japan

[21] Appl. No.: 26,968

[22] Filed: Apr. 4, 1979

[30] Foreign Application Priority Data

Apr. 11, 1978 [JP] Japan .................................. 53-42358

[51] Int. Cl.$^3$ .............................................. G02B 7/02
[52] U.S. Cl. .................................................... 350/255
[58] Field of Search ................ 350/187, 255, 429–430; 354/286, 197

[56] References Cited

U.S. PATENT DOCUMENTS 3,850,507 11/1974 Uesugi ..................................... 350/255

Primary Examiner—William H. Punter
Attorney, Agent, or Firm—Sughrue, Mion, Zinn, Macpeak and Seas

[57] ABSTRACT

A close-up lens cylinder having at least an attaching cylinder for attachment to a camera body, an operating ring for operating an advance for focussing an advancing cylinder for a straight advance and a lens frame for supporting a lens. An advancing groove is divided into a circumferentially extending groove and a lead or cam groove such that by rotating the operating ring, initially only the lens frame is advanced with respect to the attaching cylinder without advancing of the operating ring and the advancing cylinder. After the advance is substantially completed, the operating ring and the advancing cylinder are advanced together with the lens frame.

5 Claims, 5 Drawing Figures

ADVANCE MECHANISM FOR CLOSE-UP LENS

BACKGROUND OF THE INVENTION

This invention relates to an advancing device for close-up lens.

In general, a close-up lens requires a large amount of advancing and therefore a provision of a precision advancing mechanism therein. Accordingly, the entire length of the close-up lens may be long even in the state before advancement and a distance between a tip end of the lens cylinder and a first lens may also be long. Therefore, there are some disadvantages in close-up photography. For example, if an object to be photographed is a living thing such as an insect, when the lens approaches thereto, it may move, thereby missing the opportunity for a picture. Also, when the object is placed in a hole or a groove, focusing may be impossible and at this time, flash-photography may be necessary. However, the light emitted may not reach the object due to the width of the hole. Furthermore, when photographing parts of the human body during medical procedures, forceps must be placed around the body which is the object of the picture and when photographing teeth, the lens must be inserted into the mouth. Accordingly, it is desirable to make the distance between the object and the tip end of the lens cylinder (called "operation distance" hereinafter) as long as possible. Therefore, in designing a suitable close-up lens it is necessary to bring the principle point close to the object, so that the lens can be positioned as far from the object as possible.

As mentioned, because of the necessity of the advancing mechanism in the close-up lens, the length of the lens cylinder is long even in the state before advancement and also, the distance between the tip end of the lens cylinder and the first lens becomes longer. This may cause an eclipse of incident light due to the tip end of the lens cylinder and also, even through an attempt to prevent such eclipse is made, it results in an increase of the diameter of the lens. Moreover, since the lens is placed deeply within the lens cylinder, it is difficult to attach a filter, etc. to the lens.

SUMMARY OF THE INVENTION

Accordingly, it is an object of this invention to provide an advancing mechanism for a close-up lens, whereby the entire length of the lens cylinder can be made short, an operational distance in close-up photography can be made sufficiently long and an attachment of a filter or a close-up lens can be easily made.

It is another object of this invention to provide an advancing mechanism for a close-up lens that is reliable, easy to use and precise in operation.

These and other objects are attained in a close-up lens cylinder having at least an attaching cylinder for attachment to a camera body, an operating ring for operating an advance, for focussing an advancing cylinder for a straight advance and a lens frame for supporting a lens. An advancing groove is divided into a circumferentially extending groove and a lead or cam groove, such that by rotating the operating ring, initially only the lens frame is advanced with respect to the attaching cylinder without advancing of the operating ring and the advancing cylinder. After the advance is substantially completed, the operating ring and the advancing cylinder are advanced together with the lens frame.

DETAILED DESCRIPTION OF THE PREFERRED EMBODIMENTS

Figure 1:
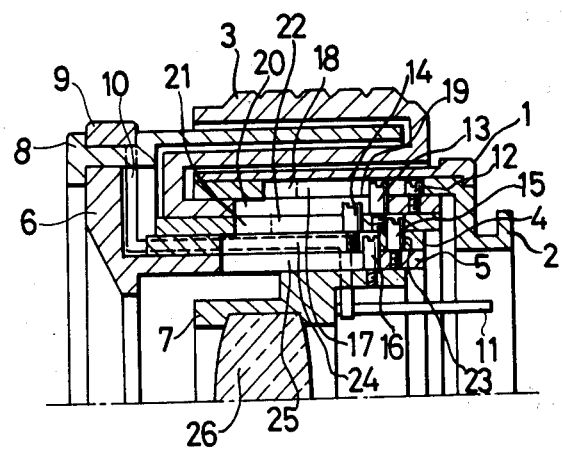
FIG. 1 is a fragmentary, longitudinal cross section of an advancing mechanism according to this invention before advancement.
Figure 2:
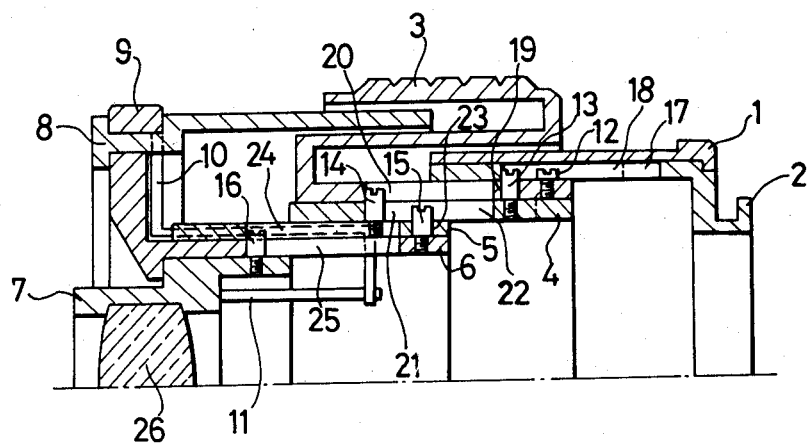
FIG. 2 is a view similar to FIG. 1 after advancement.

Referring now to the drawings, and in particular FIGS. 1 and 2 reference numeral 1 designates a cover cylinder for covering an advancing groove 17 and an elongated straight guide channel 18 formed in an attaching cylinder 2 attached to a camera body. An operating ring 3 is provided with an operating portion for distance adjustment. An advancing groove 20 has a lead mechanism for transmitting a rotational force, and a circumferentially extending groove 19 together with the operating ring are rotatably fitted around the inner surface of the attaching cylinder 2. A cam pin 12 is fixed to the operating ring 3 and engages an advancing groove 17 divided into a circumferentially extending groove 17A and a cam groove 17B (lead groove) (see FIG. 3). An advancing cylinder 4 is provided with an advancing groove 21 divided into a circumferentially extending groove 21A and a cam groove 21B, and an elongated straight guide channel 22. The advancing direction of the lens frame is vertical in FIGS. 3-4. Also, a cam pin 13 is fixed to the advancing cylinder 4 and engages with a circumferentially extending groove 19 and an elongated straight guide channel 18.

Furthermore, the advancing cylinder 4 is rotatably fitted around the inner surface of the operating ring 3. Accordingly, the advancing cylinder 4 can be only moved axially with respect to the attaching cylinder 2. A rotating cylinder 5 is provided with an advancing groove 24 having a lead mechanism and a circumferentially extending groove 23, and it is rotatably fitted around the inner surface of the advancing cylinder 4. A cam pin 14 is fixed to the rotating cylinder 5 and engages the advancing grooves 21 and 20. An advancing barrel 6 is provided with an elongated straight guide channel 25 and it is rotatably fitted around the inner surface of the rotating cylinder 5. A cam pin 15 is fixed to the advancing barrel 6 and engages the circumferentially extending groove 23 and the elongated straight guide channel 22.

A lens frame 7 for supporting a lens 26 is rotatably fitted around the inner surface of the advancing barrel 6. A cam pin 16 is fixed to the lens frame 7 and engages with the elongated straight guide channel 25 and the advancing groove 24. Also, an indication ring 8 fixed to the advancing barrel 6 has formed therein an index for the operating ring 3 and a scale of an aperture ring 9. Reference numeral 10 designates a connecting member for connecting the aperture ring 9 and an aperture rotating pin 11. The rotation of the aperture rotating ring 11 is transformed through a cam mechanism not shown so that the aperture diameter can be adjusted to meet the selected aperture value. This is an conventional structure in such lens and need not be discussed in detail. Also, it forms no part of this invention.

An advancing operation according to this invention will now be described. When the advancing operation is started by rotating the operating ring 3, only the operating ring 3 is rotated while the pin 12 moves from the position 12A to 12B shown in FIG. 3. Thereafter it is advanced together with its rotation while the pin 12 further moves from the position 12B to 12C shown in FIG. 3 because the pin 12 fixed to the operating ring 3 engages the advancing groove 17. In accordance with the rotation and advancing of the operating ring 3, the advancing groove 20 moves from the position 20A to 20B shown in FIG. 4. As a result, the pin 14 moves along the advancing groove 21 from the position 14A to 14C shown in FIG. 4. Thus, the rotating cylinder 5 to which the pin 14 is fixed and the advancing groove 24 formed in the rotating cylinder 5 move in the same manner as the pin 14.

Figure 3:
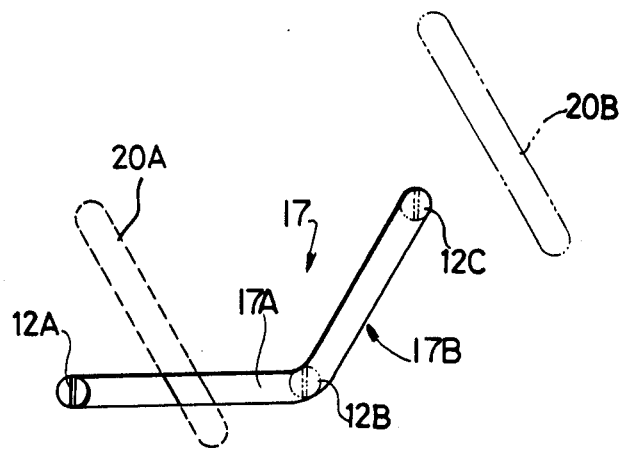
FIGS. 3, 4 and 5 are explanatory views of movement between main advancing grooves and cam pins according to this invention.
Figure 4:
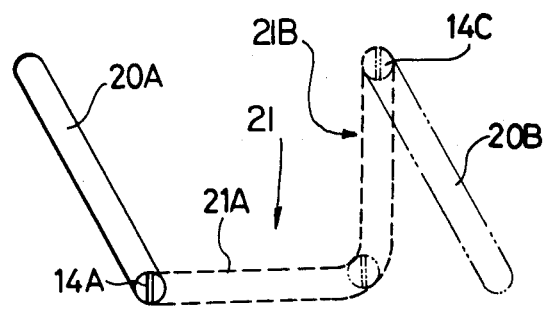
Figure 5:
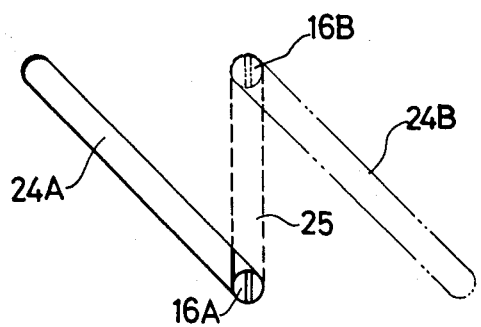

The advancing cylinder 4 is not movable with respect to the attaching cylinder 2 until the pin 12 comes into engagement with the straight guide channel 18 and the circumferentially extending groove 19, and the pin 12 movable integrally with the groove 19 move from the position 12A to 12B shown in FIG. 3. Also, the advancing cylinder 4 is advanced along the straight gudie channel 18 as the pin 12 moves from the position 12B to 12C shown in FIG. 3. Furthermore, since the advancing groove 24 moves from the position 24A to 24B shown in FIG. 5 by the rotation of the rotating cylinder 5, the pin 16 which engages the advancing groove 24 and the straight guide channel 25 formed in the advancing barrel 6 moves from the position 16A to 16B shown in FIG. 5. Accordingly, the lens frame 7 to which the pin 16 is fixed is advanced by the amount of advancing of the advancing groove 24. Consequently, the total amount of advancing is equal to the sum of the respective amounts of advancing of the advancing grooves 24, 21 and 17. The advancing barrel 6 is advanced by the engagement of the pin 15 with the straight guide channel 22 and the lens frame 7 is also advanced by the engagement of the pin 16 with the straight guide channel 25. If the amount of advancing is small, the advancing cylinder 4 may be omitted.

Thus, according to this invention, although the amount of advancing is very large, the lens cylinder can be made small in its entire length. Additionally, when the lens is positioned closer to the camera body than the tip end of the lens cylinder, the amount of advancing of the advancing grooves 17 and 21 can be made zero or very small so that the lens frame 7 can be only advanced with respect to the advancing barrel 6. Thus, the lens can be advanced to the tip end of the lens cylinder within a possible range of close-up photography, a sufficient operation distance from the subject can be obtained, and the attachment of a filter or close-up attachment lens to the lens cylinder can be easily made.

In such an advancing mechanism, various advancing modes can be achieved by varying the amount of advancing of the advancing grooves 17, 21 and 24. Moreover, if the rotating cylinder is connected to the aperture ring 9, the lens cylinder can serve as so-called "flashmatic lens". Moreover, if a ringflash is provided on the tip end of the lens cylinder, the lens cylinder can be made longer in its entire length by the length for the ring-flash to thereby show particular effects.

It is apparent that modifications for this invention can be made without departing from the essential scope of the invention.

What is claimed is:

1. In a close-up lens cylinder having at least an attaching cylinder (2) for attachment to a camera body, an operating ring (3) for operating an advance for focussing, an advancing cylinder (4) for a straight advance and a lens frame (7) for supporting a lens, the improvement comprising; an advancing groove (17) divided into a circumferentially extending groove (17A) and a second groove (17B), said advancing cylinder (4) provided with an advancing groove (21) divided into a circumferentially extending groove (21A) and a cam groove (21B), said advancing cylinder (4) further provided with an elongated straight guide channel (22), and a rotating cylinder (5) mounted for rotation around the inner surface of said advancing cylinder (4), said rotating cylinder (5) having a circumferentially extending groove (23) and an advancing groove (24), and a cam member (14) engaging the advancing groove (21) of said advancing cylinder (4) wherein by rotating said operating ring, initially only said lens frame is advanced with respect to said attaching cylinder without advancing of said operating ring and said advancing cylinder and after said advance is substantially completed, said operating ring and said advancing cylinder are advanced together with said lens frame.

2. The close-up lens of claim 1 wherein said second groove is a cam groove, and said operating ring has a member engaging said cam groove.

3. The close-up lens of claim 1 further comprising an advancing barrel rotatably mounted on the inner surface of said rotating cylinder, said advancing barrel having an elongated straight guide channel and wherein said lens frame is rotatably mounted inside said advancing barrel.

4. The close-up lens of claim 3 wherein said advancing barrel further comprises a member mounted thereon and engaging said circumferentially extending groove of said rotating cylinder.

5. The close-up lens of claim 3 wherein said lens frame comprises a member engaging said elongated straight guide channel of said advancing barrel.

* * * * *